United States Patent [19]

Misawa

[11] 4,432,426
[45] Feb. 21, 1984

[54] STAIR CLIMBING WHEELCHAIR CARRIER

[75] Inventor: Rintaro Misawa, Tokyo, Japan

[73] Assignee: Sunwa Sharyo Manufacturing Company Limited, Tokyo, Japan

[21] Appl. No.: 255,927

[22] Filed: Apr. 20, 1981

[30] Foreign Application Priority Data

Nov. 29, 1980 [JP] Japan ............................... 55-168542

[51] Int. Cl.$^3$ .............................................. B62B 5/02
[52] U.S. Cl. .................................. 180/8 A; 180/9.22; 180/DIG. 3; 280/242 WC; 280/289 WC; 280/DIG. 10; 297/DIG. 4
[58] Field of Search .................. 180/8 A, 8 B, 8 F–9, 180/9.2 R–9.1, 9.22, 9.28, 9.3, DIG. 3; 280/5.22, 47.25, 47.34, 47.37 R, 47.37 L, 47.37 C, 47.13 R, 242 WC, DIG. 10, 35; 297/DIG. 4, DIG. 10

[56] References Cited

U.S. PATENT DOCUMENTS

| 2,690,230 | 9/1954 | Budesky | 180/9.22 |
| 3,876,022 | 4/1975 | Ikarimoto | 180/9.22 |
| 4,033,421 | 7/1977 | Ikarimoto | 180/9.22 |
| 4,062,418 | 12/1977 | Misawa | 180/9.22 |
| 4,077,483 | 3/1978 | Randolph | 180/DIG. 3 |

FOREIGN PATENT DOCUMENTS

| 237802 | 1/1965 | Austria | 280/5.22 |
| 1428315 | 3/1976 | United Kingdom | 180/9.22 |
| 1546130 | 5/1979 | United Kingdom | 180/8 A |

Primary Examiner—Joseph F. Peters, Jr.
Assistant Examiner—Mitchell J. Hill
Attorney, Agent, or Firm—Martin A. Farber

[57] ABSTRACT

A stair climbing wheelchair carrier having a carrier portion comprising a pair of endless belt crawlers, and a handle portion rotatably and detachably provided on the carrier. The handle portion is adapted to be rotated between an operating position and a wheelchair engaging position. The endless belt crawler has an oblique overhang portion which has a height higher than a usual height of a step of a staircase. The upper portion of endless belt crawlers are maintained by idlers in substantially horizontal position except the oblique overhang portion so that the wheelchair may be moved on the carrier portion and may be engaged with the handle portion at the wheelchair engaging position of the handle portion. The wheelchair is mounted on the carrier portion by rotating the handle portion to the operating position.

7 Claims, 15 Drawing Figures

STAIR CLIMBING WHEELCHAIR CARRIER

BACKGROUND OF THE INVENTION

The present invention relates to a stair-climbing wheelchair carrier on which a wheelchair with a disabled passenger seated therein may be easily mounted, and particularly to a stair-climbing wheelchair carrier which is easily operable in loading and also in unloading.

In a stair-climbing carrier with crawler for the transportation of a disabled individual seated in his wheelchair up and down the stairs, the crawler must have an oblique overhang portion which has a greater height than the usual height of a step in a staircase. Consequently, the crawler of the conventional stair-climbing carrier has an inclined upper traveling portion.

On the other hand, because the foldable construction of the wheelchair, a crossbar is provided under a wheelchair seat and defines an available space under the seat. Therefore, the crossbar obstructs the inclined upper traveling portion from being sufficiently inserted under the wheelchair seat.

Accordingly, the wheelchair carrier is provided with a special loading device movable to the end of the wheelchair carrier and the loading of the wheelchair is done by outside crawlers with the loading device. Such a device necessitates a complicated construction.

SUMMARY OF THE INVENTION

The present invention overcomes these inconveniences by the provision of an improved stair-climbing wheelchair carrier, the purpose of which is to provide a simpler construction and operation than heretofore available.

With the above and other objects and advantages in view, the present invention will become more clearly understood in connection with the detailed description of preferred embodiments, when considered with the accompanying drawings, of which:

DETAILED DESCRIPTION OF PREFERRED EMBODIMENTS

Figure 1:
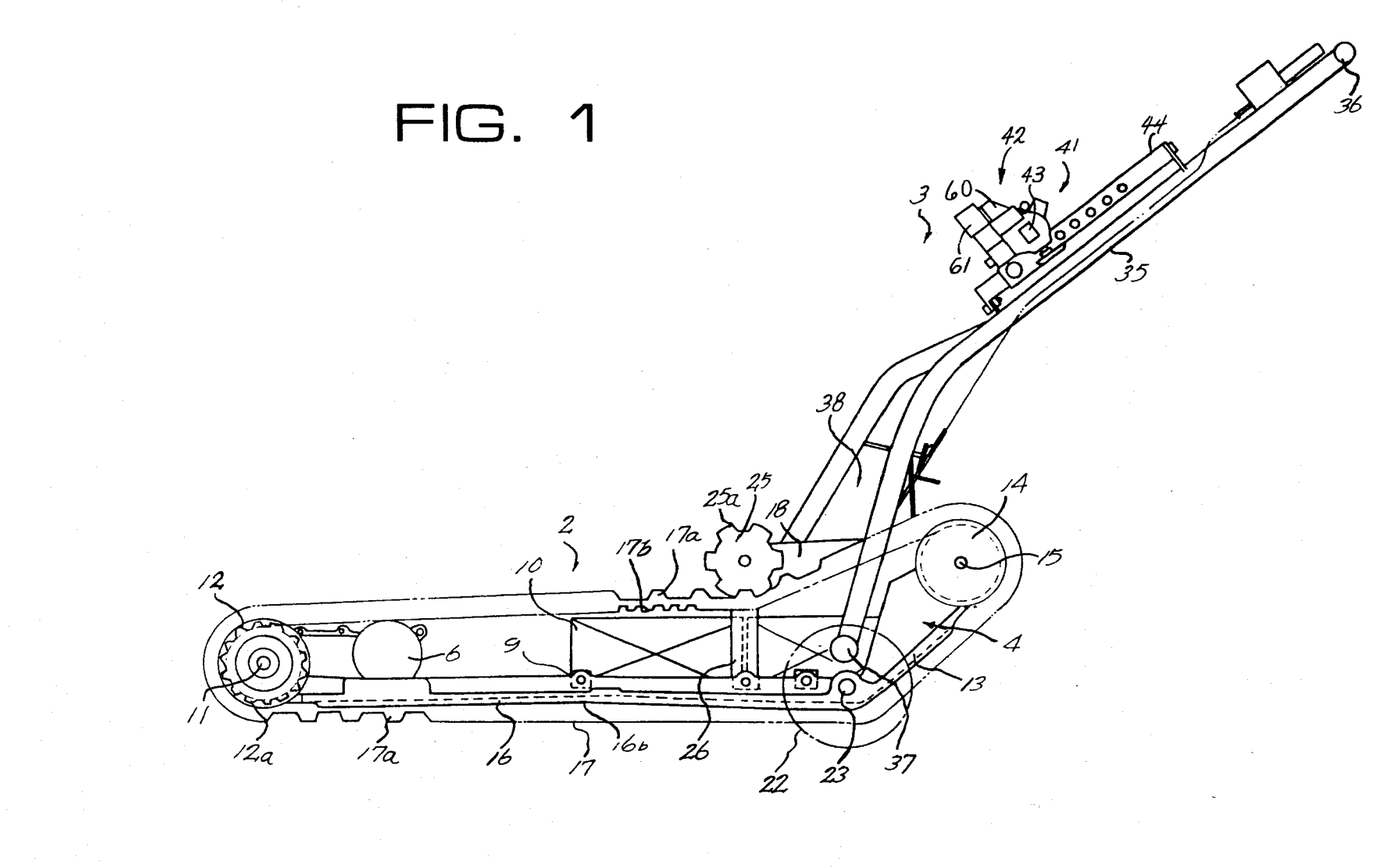
FIG. 1 is a side view showing a stair-climbing wheelchair carrier in accordance with one of preferred embodiments of the present invention.

FIG. 1 is a side view generally showing a stair-climbing wheelchair carrier 1 which is comprised of a wheelchair carrier portion 2 and a handle portion 3.

Figure 2:
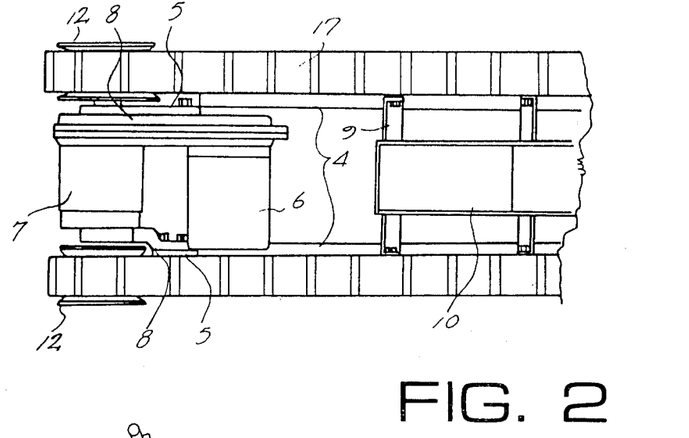
FIG. 2 is a plan view according to FIG. 1.
Figure 3:
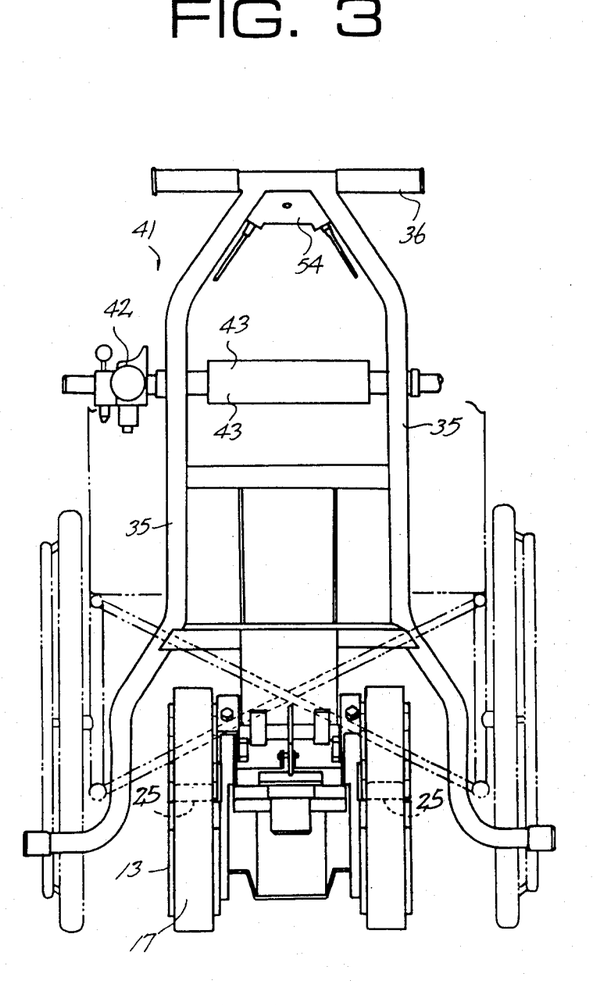
FIG. 3 is a rear view according to FIG. 1.

As shown in FIGS. 1 and 2, the wheelchair carrier portion 2 has a pair of rail-frames 4 of aluminum diecasting, rear ends of which are curved upwards like a sleigh. These frames 4 are disposed parallel on each side of the carrier 2.

Flanges 5 formed on ends of the frames 4 are connected to each other through an attaching flange 8 of a reduction gear case which combines a driving motor 6 and a reduction gear 7.

Connecting members 9 having an L-shaped cross-section are bridged over the frames 4 at an intermediate position of an the longitudinal of the frame 4 to constitute the frame body of wheelchair carrier. A battery 10, a power source of the driving motor 6, is supported on the connecting members 9.

A pair of driving wheels 12 are secured to a driving shaft 11 connected to the reduction gear 7 and idlers 14 are mounted on shafts 15 provided on the rear or upper end of an oblique overhang portion 13. Each idling wheel 14 is rotatably attached to each end of the idling shaft 15 provided at the upper end of the oblique overhang portion 13. A belt crawler 17 is engaged with a guide groove of the wheel 12, a grounding guide portion 16, an underface guide groove of the oblique overhang portion 13 and a guide groove of the idling wheel 14. A pair of belt crawlers 17 are parallel, the distance therebetween being smaller than the distance between a pair of wheels of the wheelchair.

Figure 4:
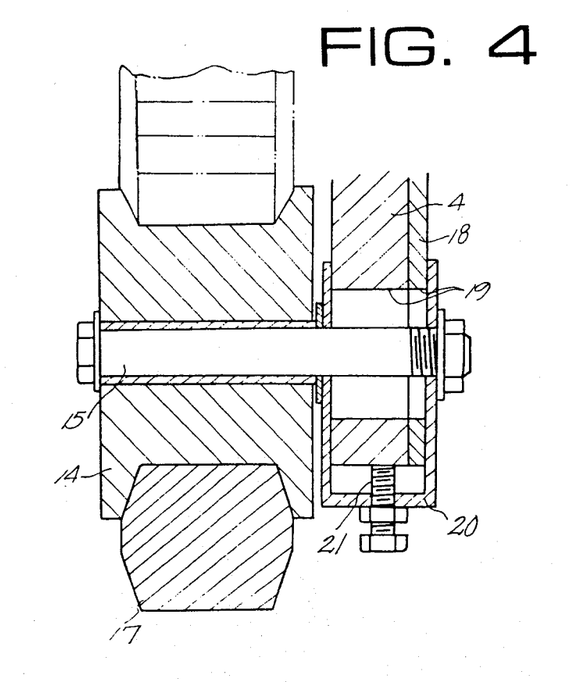
FIG. 4 is a cross-sectional view showing the suspension of idle wheels.

As shown in FIG. 4 the idling shaft 15 through slots 19 provided in the frame 4 and a side plate 18.

A holding member 20 having a U-shaped cross section is slidably provided on the frame 4 and the side plate 18. The inner end of the shaft 15 is fixed to the holding member 20. Thus, the holding member 20 is moved along the slots 19 together with the shaft 15 by turning a screw 21. The screw 21 is fixed in a proper position to give a sufficient tension to the belt crawler 17.

Taking into account varied road and staircase conditions, the belt crawlers 17 are made of elastic synthetic rubber to absorb shock as well as to protect the floor plate or staircase.

The belt crawler 17 is provided with lugs 17a disposed at predetermined intervals to properly engage with steps of a staircase. The inner surface of the belt crawler 17 is provided with lugs 17b engageable with driving teeth 12a, preventing the belt crawler from slipping around the driving wheels 12. The belt crawler 17 has a span extending over two steps.

Figure 5:
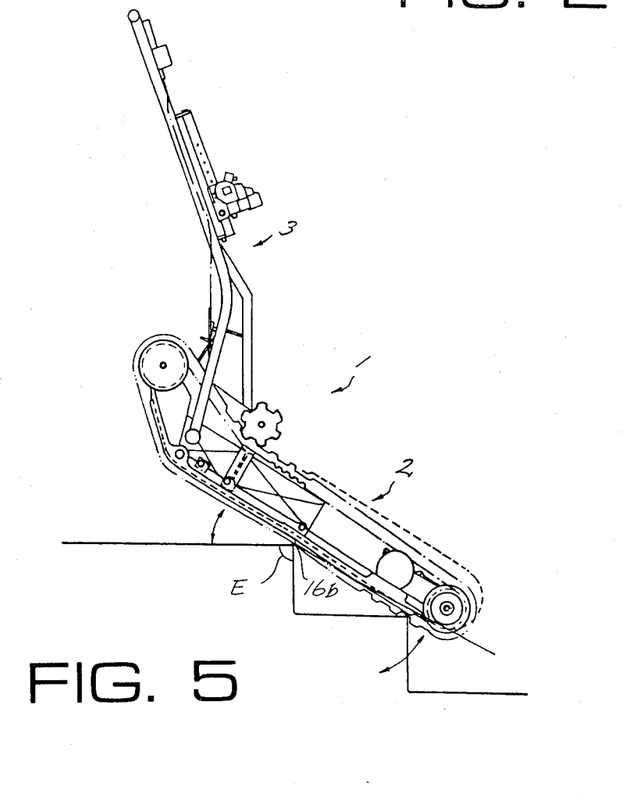
FIG. 5 is view showing the stair-climbing operation of the carrier.

The grounding guide portion 16 of the rail frame 4 is bent upward slightly at the intermediate point to form an inverted V shaped portion 16b near the center of gravity of the total load weight with the wheelchair. Referring to FIG. 1 and FIG. 5, when the wheelchair carrier starts to descend the stair, the carrier rotates gradually about the edge E of the stair owing to the inverted V-shaped portion 16b. Therefore, the operator can set the wheelchair carrier onto the staircase without fear.

Figure 6:
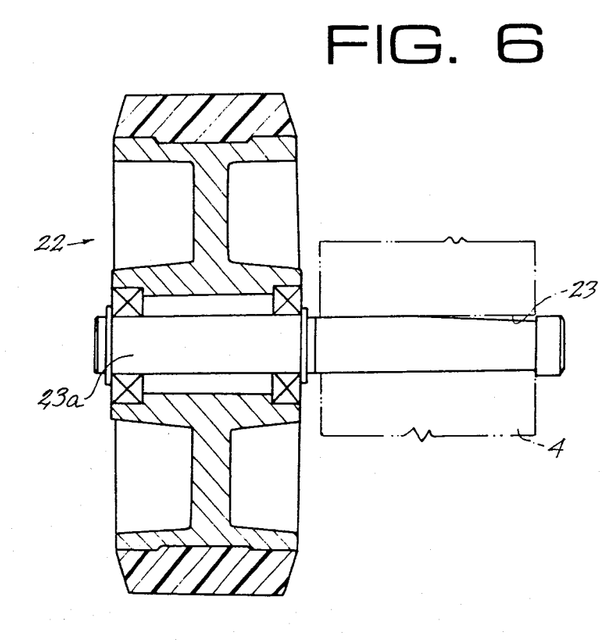
FIG. 6 is a cross sectional view showing the attachment of transport wheels.
Figure 7:
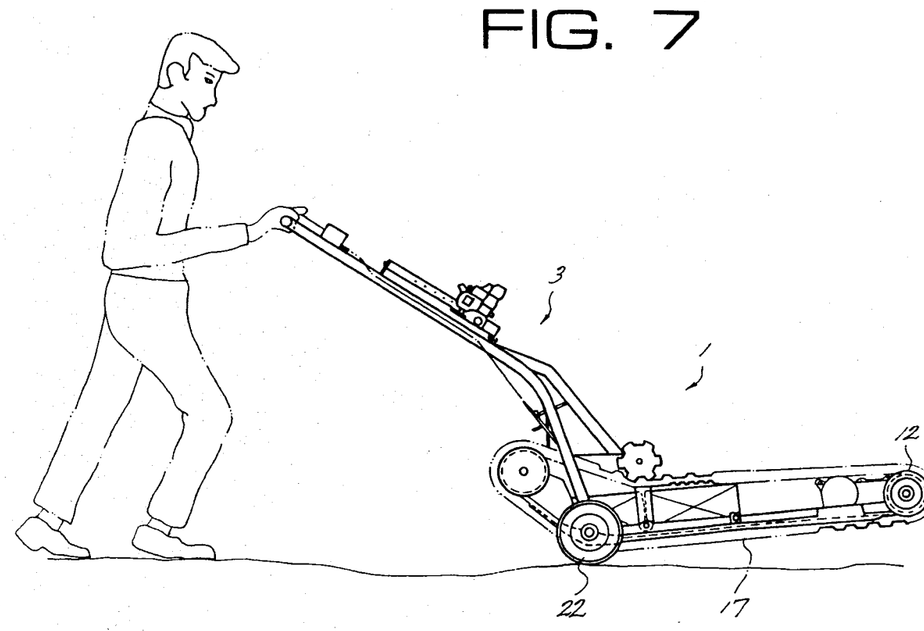
FIG. 7 is a schematic view showing the usage of transport wheels.

The frame 4 has a pair of holes 23 at opposite sides of a rear portion of the carrier for attaching a transport wheel 22. As shown in FIG. 6, the transport wheel 22 is supported on the shaft 23a. The shaft 23a has a taper portion and a flange at the inner end.

Figure 8:
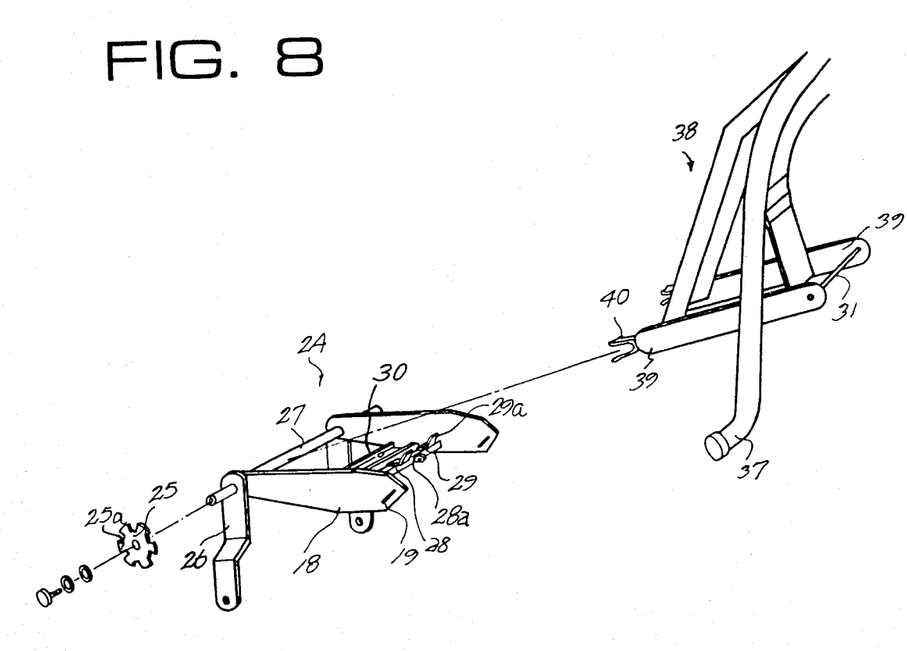
FIG. 8 is a perspective view showing an attaching device.
Figure 9:
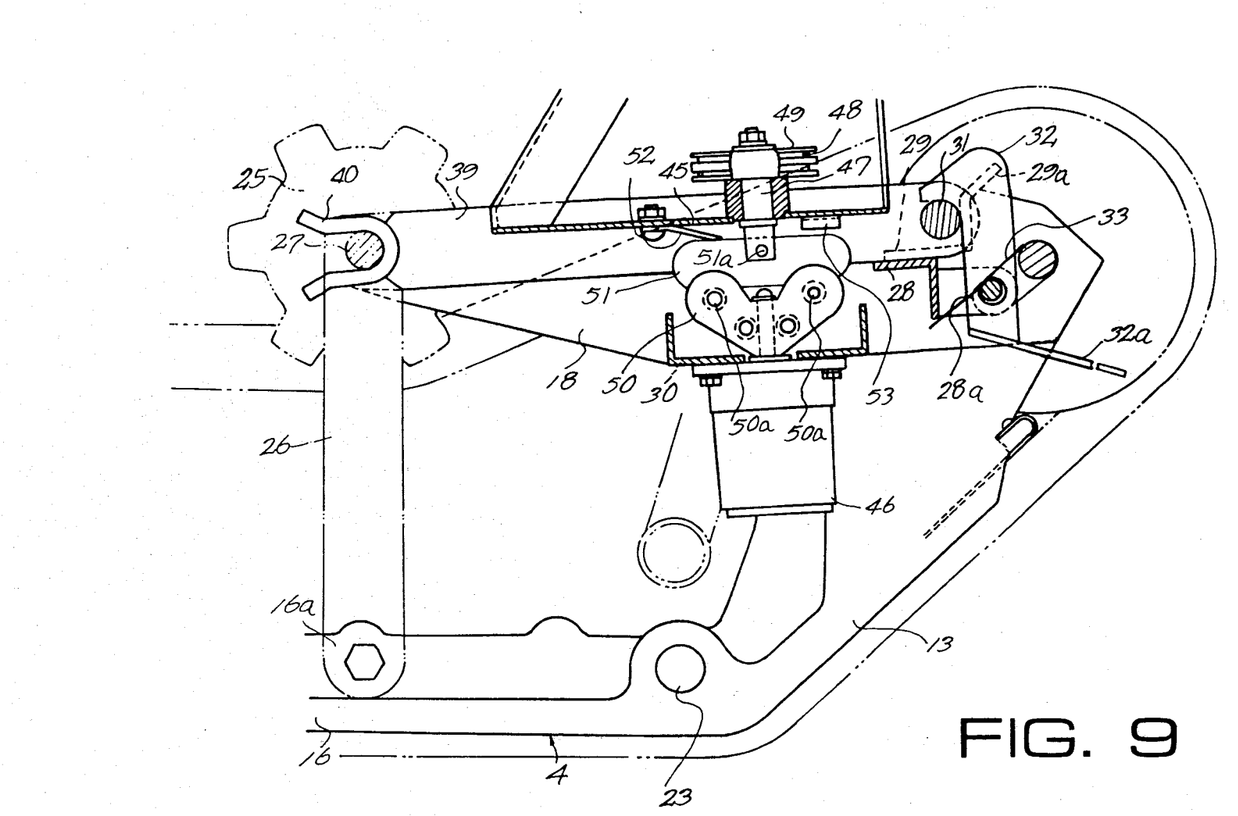
FIG. 9 is a side view showing the vicinity of the attaching device.

Referring to FIGS. 1, 8 and 9, an attaching device 24 is provided in a rear portion of the wheelchair carrier for attaching the handle portion 3. The attaching device 24 comprises a pair of side plates 18, legs 26 secured to ends of side plates 18, a shaft 27 secured to side plates 18, idlers 25 rotatably mounted on opposite ends of the shaft 27, and supporting plates 28 and 30 secured to side plates 18. Each leg 26 is secured to the guide portion 16 at a lug 16a. Each idler 25 has teeth 25a which engage with lugs 17a of the belt crawler 17, so that the upper moving portion of the belt crawler is deflected to a substantially horizontal plane.

A pair of engaging members 29 each of which has an upwardly inclined projection 29a are secured to the supporting plate 28. A hook 32 is pivotally supported on a lug 28a secured to the supporting plate 28. The hook 32 is urged in the counterclockwise direction by a spring 33 to engage with an engaging shaft 31. The hook 32 is rotated in the clockwise direction with depressing a pedal 32a by the foot.

Figure 10:
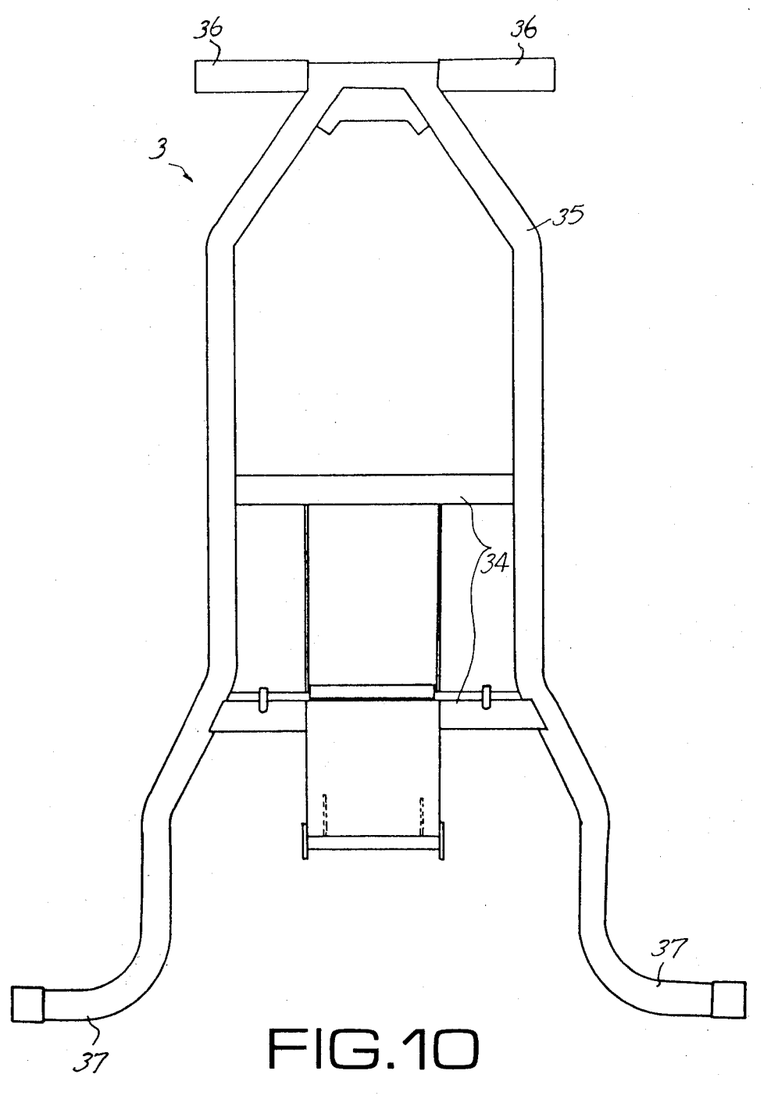
FIG. 10 is a rear view of a holding handle.
Figure 11:
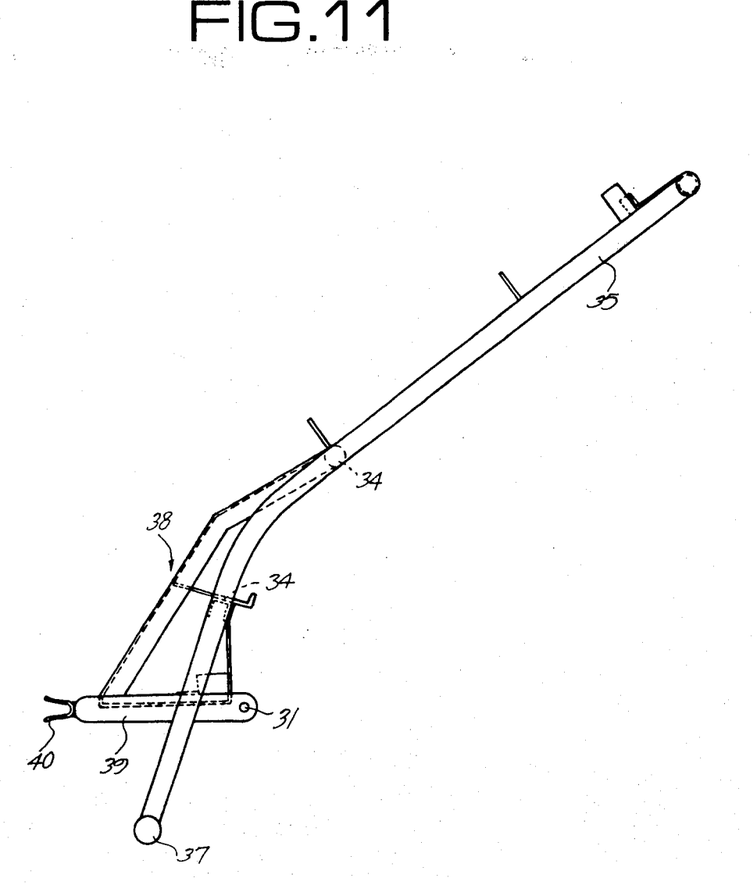
FIG. 11 is a side view of the same.

Referring to FIGS. 10 and 11, the handle portion 3 comprises a frame 35 having reinforcement members 34, a pair of grips 36, and a pair of wheel holding portions 37. An engaging device 38 is secured to the reinforcement members 34. The engaging device 38 comprises a pair of receiving plates 39, the engaging shaft 31 secured to the plates 39, and a pair of receiving members 40 secured to ends of plates 39.

As shown in FIG. 9, the receiving members 40 engage with the shaft 27 and the engaging shaft 31 engages with the hook 32 and with the upwardly inclined projection 29a, and plates 39 are put on the supporting plate 28. Thus, the handle is attached to the attaching device 24.

Figure 12:
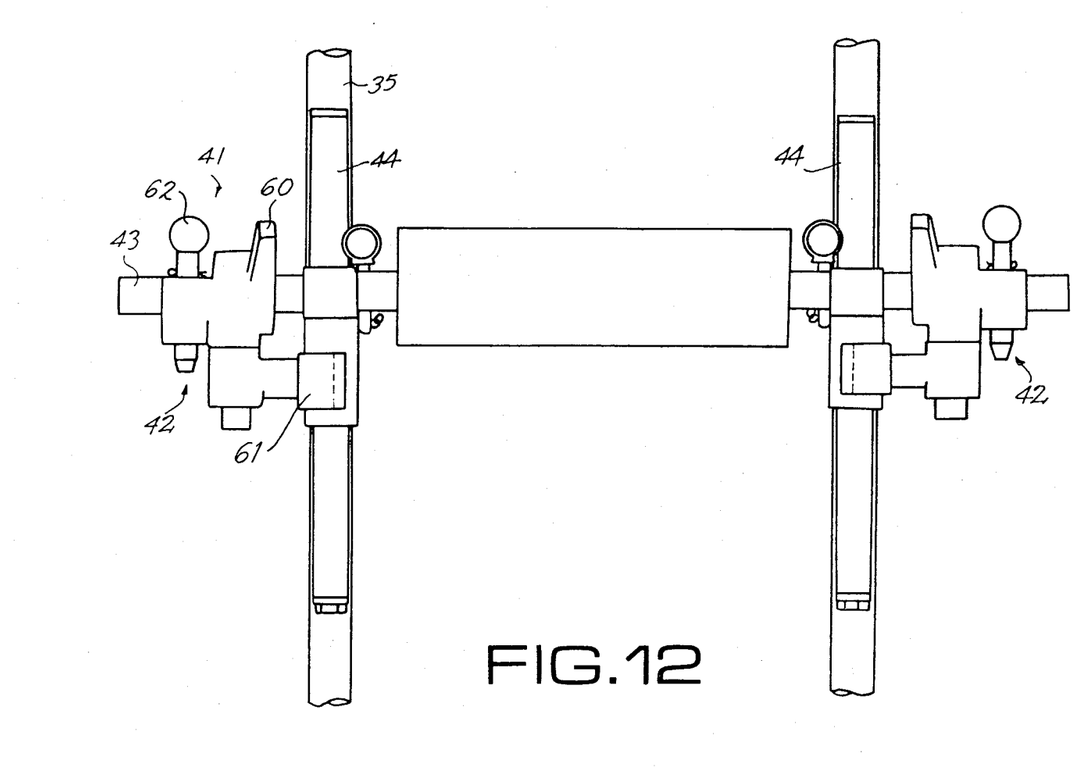
FIG. 12 is a plan view showing the holding device.

Referring to FIG. 12 showing a wheelchair holding device 41 provided on the frame 35 of the handle 3, the wheelchair holding device 41 comprises a pair of engaging devices 42 for engaging with a handle H of the wheelchair, a back bar 43 for supporting the engaging devices 42, and a pair of guide bars 44 secured to the frame 35 for supporting the back bar 43. The back bar 43 is adapted to be moved along the guide bars 44 and secured thereto at a desired position.

The engaging device 42 is slidable on the back bar 43 in accordance with the distance between a pair of handles H and adapted to be secured to the back bar. The engaging device 42 comprises a projection 60 to be abutted on the outer side of the handle H, a rotatable arm 61 to be engaged with the front side of the handle, and a stopper 62 for preventing the rotatable arm 61 from being removed from the handle.

As shown in FIG. 9, an operating device is provided on a base plate 45 secured between plates 39 for operating a switch box 46 for the motor 6. The operating device comprises a rotary shaft 47 rotatably supported on the base plate 45, a pulley 49 and secured to the shaft 47, a cable 48 engaged with the pulley 49, an actuating plate 51 pivoted to the lower end of the shaft 47 by a pin 51a.

The actuating plate 51 engages between a pair of butterfly handles 50 which are connected by pins 50a with each other, and secured to the shaft of the switch box 46. The actuating plate 51 is urged counterclockwise by a spring 52 to engage with the pin 50a. Thus, the rotation of actuating plate 51 may be transmitted to the handles 50. The shaft of the switch box 46 is automatically returned to the O-position when the motor is stopped. On the other hand, a pair of stoppers 53 are provided on the underside of the base plate 45 at a position corresponding to the O-position. Therefore, if the plate 51 is removed from the handles 50, the actuating plate 51 is rotated by the spring 52, so that the other end of the plate 51 engages with the stoppers 53.

Figure 13:
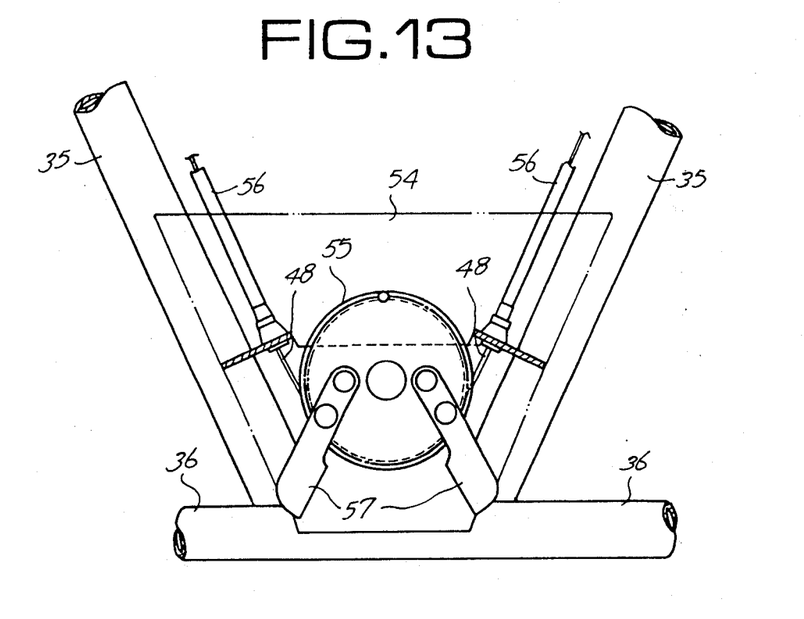
FIG. 13 is a plan view of a driving pulley portion.
Figure 14:
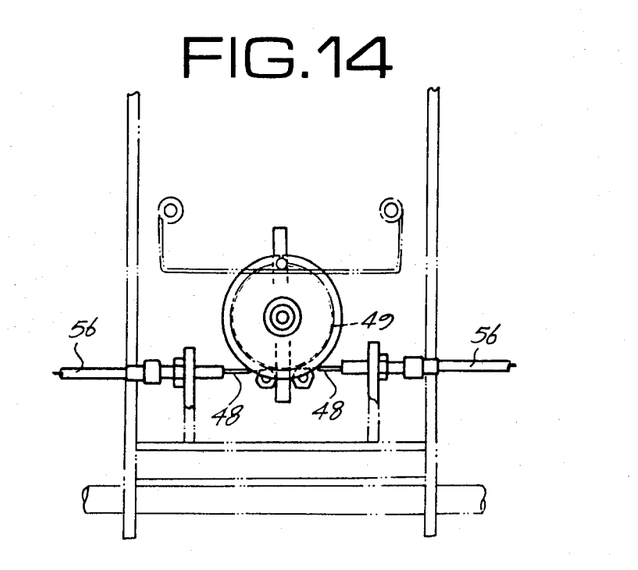
FIG. 14 is a plan view of a driven pulley portion.

The cable 48 is wound on pulley 49 and pulley 55 provided on a support 54 (FIG. 13) about one turn respectively. The cable 48 is slidably engaged in guide pipes 56. A pair of handles 57 are secured to the pulley 55 positioned near grips 36. Thus, when the pulley 55 is rotated with handles 57, the cable 48 is moved to rotate the pulley 49, so that the shaft of the switch box 46 is rotated through actuating plate 51 and butterfly handles 50.

Figure 15:
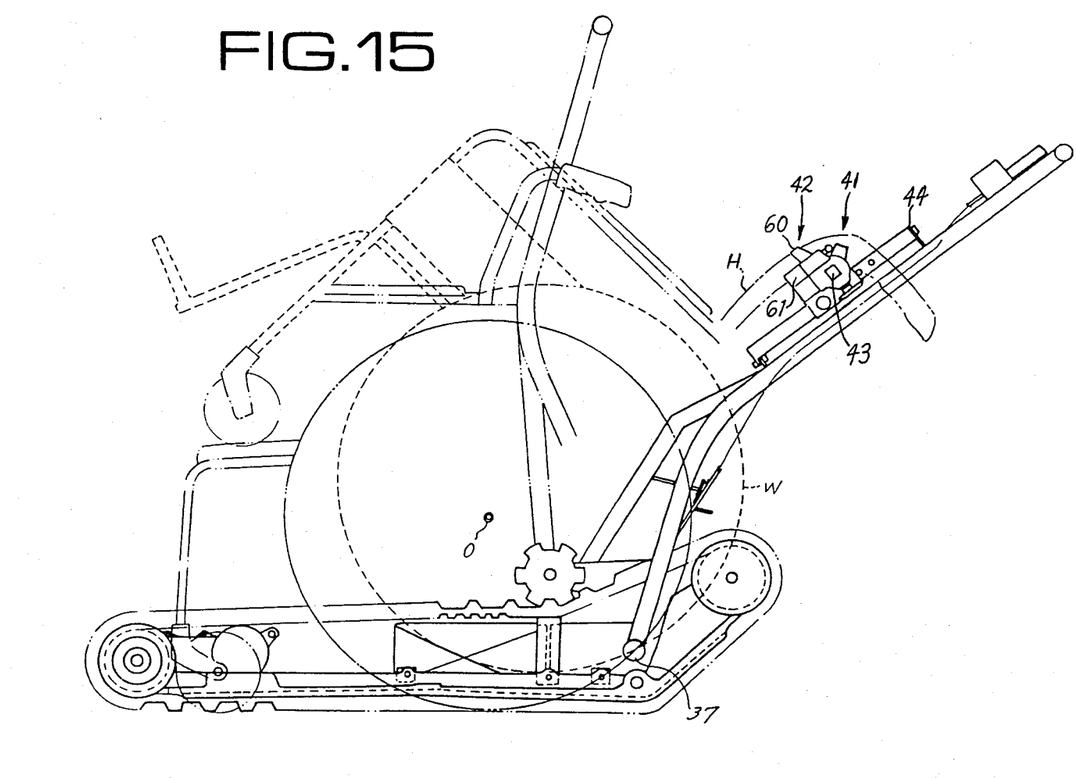
FIG. 15 is of the attachment of the wheelchair.

To mount the wheelchair on the carrier 1, first the pedal 32a is depressed by the foot to release the hook 32 from the engaging shaft 31. Then the handle portion 3 is rotated about the shaft 27 to the raised position as shown in FIG. 15. At that time, the plate 51 rotates about the pin 51a so that the end of the plate engages between stoppers 53. In such a position, wheelchair is moved on the carrier until the wheels W abut on holding portion 37, and then the handle H of the wheelchair is engaged with engaging devices 42. By adjusting the back bar 43 along the guide bar 44, the back bar engages with an underside of a grip portion of the handle H for supporting the wheelchair. Then, the projection 60 is abutted on the outer side of the handle and the arm 61 is engaged with the front side of the handle. Thus, the wheelchair is held by the wheelchair holding device 41. Thereafter, the handle portion 3 is rotated in the clockwise direction to the initial position so that the bar 31 is engaged with the hook 32. Thus, the wheelchair is held in position for ascending or descending the stair. The plate 51 engages with a pin 50a. Since the shaft 27 of the rotation of the handle 3 is positioned near the shaft O of the wheel W, the operation for rotating the handle may be easily done with a small force. The wheelchair carrier 1 ascends or descends the stair by the motor 6 by operating the switch box 46 through handles 57.

To remove the wheelchair from the carrier, the motor 6 is stopped by operating the handles 57, so that the actuating plate 51 is returned to the O-position. The pedal 32a is depressed and wheelchair is removed in the reverse order to the above described manner for mounting the wheelchair.

In order to transport the wheelchair carrier 1, the handle portion 3 may be removed from the carrier portion 2. In such a condition, the carrier portion 2 may be moved by directly operating the handles 50.

What is claimed is:
1. A stair climbing wheelchair carrier comprising:
a carrier portion including a frame,
a pair of endless belt crawlers on said frame,
a plurality of pairs of wheels rotatably supported on said frame for guiding said endless belt crawlers and a driving motor for driving one of said pairs of wheels,
each of said endless belt crawlers having a predetermined span in a longitudinal direction extending over a predetermined extent of two steps in a staircase and an oblique overhang portion at one end of said frame which has a first predetermined height higher than the usual height of a step in a staircase,
a handle portion rotatably and detachably attached to said carrier portion at a portion adjacent to said oblique overhang portion so as to be rotated in the longitudinal direction of said carrier, said handle portion being adapted to be rotated between an operating inclined position with respect to said carrier portion and a wheelchair engaging upright position with respect to said carrier portion, means for securing said handle portion to said frame at said operating inclined position, a pair of idlers mounted adjacent to said oblique overhang portion and depressingly engaging said endless belt crawlers at upper moving portions thereof adjacent to said oblique overhang portion so as to decrease the height of the upper moving portions so that substantially most of said carrier portion including substantially up to said overhang portion has a second predetermined height lower than the top of a central free space beneath a wheelchair permitting the wheelchair to approach said handle portion, a wheelchair holding means provided on said handle portion for holding the wheelchair when said handle portion is at said wheelchair engaging upright position, whereby said wheelchair is set in the inclined operating position by rotating said handle portion from said wheelchair engaging position to said inclined operating position.

2. A stair climbing wheelchair carrier in accordance with claim 1 further comprising a switch box provided on said carrier portion for operating said motor, and means provided on said handle portion for operating said switch box.

3. A stair climbing wheelchair carrier for climbing stairway steps comprising:
a carrier portion including a frame,
a pair of endless belt crawlers on said frame,
a plurality of pairs of wheels rotatably supported on said frame for guiding said endless belt crawlers and a driving motor for driving one of said pairs of wheels,
each of said endless belt crawlers having a predetermined span in a longitudinal direction extending over a predetermined extent of two steps in a staircase and an oblique overhang portion at one end of said frame which has a first predetermined height higher than the usual height of a step in a staircase,
a handle portion rotatably and detachably attached to said carrier portion at a portion adjacent to said oblique overhang portion so as to be rotated in the longitudinal direction of said carrier, said handle portion being rotatable between an operating inclined position with respect to said carrier portion and a wheelchair engaging upright position with respect to said carrier portion,
a pair of idlers mounted adjacent to said oblique overhang portion and depressingly engaging said endless belt crawlers at upper moving portions thereof adjacent to said oblique overhang portion so as to decrease the height of the upper moving portions so that substantially most of said carrier portion including substantially up to said overhang portion has a second predetermined height lower than the top of a central free space beneath a wheelchair permiting the wheelchair to approach said handle portion, and
a wheelchair holding means provided on said handle portion for detachably securing the wheelchair to said handle portion when said handle portion is at said wheelchair engaging upright position such that movement of said handle portion to the inclined operating position causes movement of said wheelchair to the inclined operating position, wherein said wheelchair carrier can carry said wheelchair while climbing stairway steps.

4. The stair climbing wheelchair carrier according to claim 3, wherein
said handle portion is detachably secured to said carrier portion.

5. The stair climbing wheelchair carrier according to claim 3, wherein
said wheelchair holding means are disposed on said handle portion for securing a predetermined portion of said wheelchair such that movement of said handle portion from said wheelchair engaging upright position to said inclined operating position elevates said wheelchair with respect to said carrier portion.

6. A stair climbing wheelchair carrier for climbing stairway steps comprising:
a carrier portion including a frame,
a pair of endless belt crawlers on said frame,
a plurality of pairs of wheels rotatably supported on said frame for guiding said endless belt crawlers and a driving motor for driving one of said pairs of wheels,
each of said endless belt crawlers having a predetermined span in a longitudinal direction and an oblique overhang portion at one end of said frame which is elevated a predetermined amount relative to one of the stairway steps,
at least one part of said carrier portion having a predetermined height to permit a wheelchair, that is to be carried, to move with clearance over said one part for predetermined positioning with respect to said carrier portion,
a handle portion rotatably secured to said carrier portion so as to be rotated in the longitudinal direction of said carrier between an operating inclined position with respect to said carrier portion and a wheelchair engaging upright position with respect to said carrier portion, and
a wheelchair holding means provided on said handle portion for detachably securing a wheelchair to said handle portion when said handle portion is at said wheelchair engaging upright position such that movement of said handle portion to the inclined operating position causes movement of said wheelchair to the inclined operating position, wherein said wheelchair carrier can carry said wheelchair while climbing stairway steps,
said carrier portion frame has an inverted V-shaped portion at a predetermined longitudinal location in substantial alignment with the center of gravity of the load supported by said carrier when said handle portion is in said inclined operating position.

7. A stair climbing wheelchair carrier for climbing stairway steps comprising:
a carrier portion including a frame,
a pair of endless belt crawlers on said frame,
a plurality of pairs of wheels rotatably supported on said frame for guiding said endless belt crawlers and a driving motor for driving one of said pairs of wheels,
each of said endless belt crawlers having a predetermined span in a longitudinal direction and an oblique overhang portion at one end of said frame which is elevated a predetermined amount relative to one of the stairway steps, at least one part of said carrier portion having a predetermined height to permit a wheelchair, that is to be carried, to move with clearance over said one part for predetermined positioning with respect to said carrier portion, a handle portion rotatably secured to said carrier portion so as to be rotated in the longitudinal direction of said carrier between an operating inclined position with respect to said carrier portion and a wheelchair engaging upright position with respect to said carrier portion, and a wheelchair holding means provided on said handle portion for detachably securing a wheelchair to said handle portion when said handle portion is at said wheelchair engaging upright position such that movement of said handle portion to the inclined operating position causes movement of said wheelchair to the inclined operating position, wherein said wheelchair carrier can carry said wheelchair while climbing stairway steps, switching means on said carrier portion for operating said motor, and means on said handle portion for operating said switching means.

* * * * *